US006854795B2

(12) United States Patent
Yamazaki et al.

(10) Patent No.: US 6,854,795 B2
(45) Date of Patent: Feb. 15, 2005

(54) AUTOMOTIVE SIDE SILL REINFORCEMENT STRUCTURE

(75) Inventors: Shouji Yamazaki, Wako (JP); Hideki Koga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/404,705

(22) Filed: Mar. 31, 2003

(65) Prior Publication Data

US 2003/0184126 A1 Oct. 2, 2003

(30) Foreign Application Priority Data

Apr. 2, 2002 (JP) ........................................ 2002-100180

(51) Int. Cl.[7] .............................................. B62D 25/20
(52) U.S. Cl. .............. 296/209; 296/187.12; 296/203.03
(58) Field of Search ........................ 296/187.03, 187.08, 296/187.12, 193.05, 193.06, 193.07, 204, 205, 203.03, 209

(56) References Cited

U.S. PATENT DOCUMENTS 2,597,837 A * 5/1952 Lindsay ...................... 296/209
5,246,264 A    9/1993 Yishii
5,352,011 A * 10/1994 Kihara et al. .......... 296/203.03
5,443,297 A * 8/1995 Tanaka et al. .......... 296/203.03
5,924,765 A * 7/1999 Lee ............................. 296/209
6,270,153 B1 * 8/2001 Toyao et al. ................. 296/204
6,409,257 B1 * 6/2002 Takashina et al. .......... 296/209

FOREIGN PATENT DOCUMENTS

| EP | 0856455 | 8/1998 |
|---|---|---|
| EP | 0 856 455 | 8/1998 |
| JP | 05-319301 | 12/1993 |
| JP | 7-117727 | 5/1995 |
| JP | 10-218035 | 8/1998 |
| JP | 2000-238666 | 9/2000 |

* cited by examiner

Primary Examiner—Patricia L. Engle
(74) Attorney, Agent, or Firm—Merchant & Gould P.C.

(57) ABSTRACT

A reinforcement member (32) of an automotive side sill includes a V-shaped cross-sectional portion (46) formed by bending the reinforcement member so as to follow a lower surface (31b) of an upper portion (31a) of an outer panel (31), joining an upper attaching portion (42) functioning as a resulting bent portion to the upper portion (31a) of the outer panel (31) and bending a distal end of the upper attaching portion (42) downwardly.

1 Claim, 12 Drawing Sheets

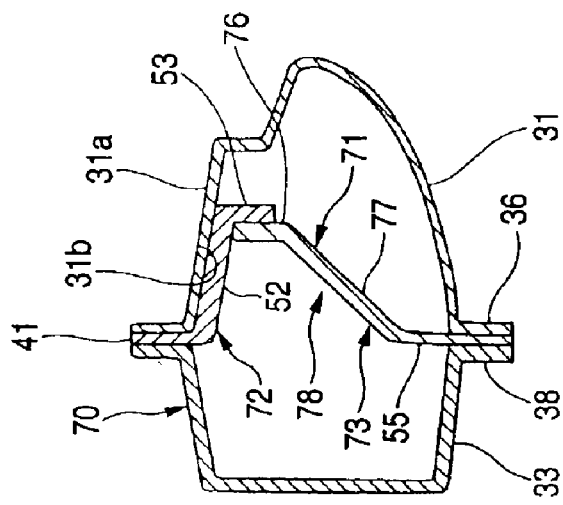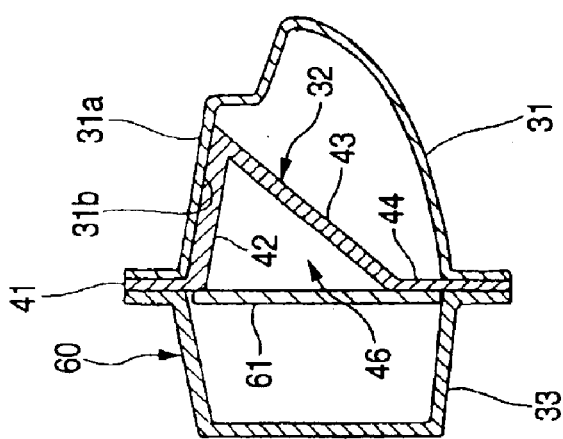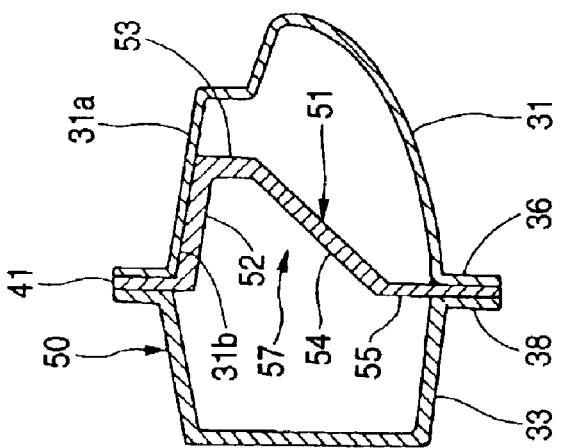

AUTOMOTIVE SIDE SILL REINFORCEMENT STRUCTURE

BACKGROUND OF THE INVENTION

1. Field of the Invention

The present invention relates to an automotive side sill reinforcement structure which is preferable to increase the bending stiffness and torsional stiffness of a side sill with a simple construction.

2. Description of the Related Art side sills disposed on left and right sides of a vehicle to extend in a longitudinal direction are members constituting side bodies of the vehicle. Front pillars and center pillars are provided to rise from the respective side sills, so that a roof panel is mounted on the respective pillars, whereby a framework for a passenger compartment is formed. Thus, the side sills constitute a member which forms a base for the passenger compartment framework and determines the stiffness of the vehicle body.

For example, the deformation of the passenger compartment framework of a vehicle that occurs when another vehicle collides against the side thereof needs to be restrained to a minimum level, and the reinforcement of the side sill plays a crucial role.

Deformed conditions of side sills resulting from side collisions of vehicles will be described below.

FIGS. 5A, 5B are explanatory views of a conventional side sill.

FIG. 5A is a perspective view showing the vehicle body framework construction of a vehicle, in which a front pillar 101 is made to rise from a front end of a side sill 100, a center pillar 102 is made to rise from a middle portion of the side sill, a roof side rail 103 is attached to upper ends of the front pillar 101 and the center pillar 102, a roof rail 104 is made to extend between the left and right roof side rails 103, and front floor cross members 105 are made to extend between the left and right side sills 100, so that a passenger compartment framework is formed.

FIG. 5B is a sectional view taken along the line V—V in FIG. 5A, and as is seen therefrom, the side sill 100 includes an outer member 108 and an inner member 111 which is attached to a passenger compartment side of the outer member 108.

The deformation of the side sill 100 will be described below which would result when a load P corresponding to a load that would be applied during a side collision of vehicles is applied to the center pillar 102 above the side sill 100 in a direction indicated by an arrow.

FIG. 6 is a perspective view for describing the deformation of a conventional side sill and is an approximation model for the side sill and the center pillar shown in FIGS. 5A, 5B.

Namely, end portions of the side sill 100 are supported by support members 112, 113 which function as a fulcrum, and an upper end portion of the center pillar 102 is supported by a support member 114 which functions as a fulcrum.

Then, the load P is applied to the center pillar 102 above the side sill 100 in the direction indicated by the arrow.

FIGS. 7A, 7B are first explanatory views explaining how the applied load P deforms the conventional side sill, in which FIG. 7A is a view as viewed in a direction indicated by an arrow VII in FIG. 6, and FIG. 7B is a view as viewed in a direction indicated by an arrow VII' in FIG. 6.

In FIG. 7A, assuming that a load applied point on the center pillar 102 is A, a cross-sectional center of the side sill 100 is B, and a distance between the load applied point A and the cross-sectional center B is L, a torsional moment PL is generated in the side sill 100.

In addition, in FIG. 7B, a bending moment PM is generated in the side sill 100 between the support members 112, 113 at the same time as the torsional moment PL is generated.

FIGS. 8A, 8B are second explanatory views explaining the deformation of the conventional side sill by the load P, in which enlarged views of main parts of the side sill 100 and the center pillar 102 are used for the explanation.

In FIG. 8A, a shear force is generated in the side sill 100 in which the torsional moment PL is generated, and assuming that the side sill 100 is constituted by an upper wall 100a, a lower wall 100b, a left wall 100c and a right wall 100d, for example, a tensile force TE inclined relative to the axis of the side sill 100 and a compressive force CM normal to the tensile force TE are generated in the upper wall 100a and the right wall 10d, respectively.

In FIG. 8B, in the side sill 100 in which the bending moment PM is generated, in the direction of a J—J line (which extends horizontally to intersect the axis of the side sill 100 at right angles), a tensile force (which is represented by "Tens" and "−", and which tends to increase as it moves away from the cross-sectional center B along the J—J line) is generated, as a whole, on a left wall 100c side of the cross-sectional center B, and a compressive force (which is represented by "Comp" and "+" and which tends to increase as it moves away from the cross-sectional center B along the J—J line) is generated, as a whole, on a right wall 100d side thereof.

FIGS. 9A, 9B are third explanatory views explaining the deformation of the conventional side sill by the applied load, in which FIG. 9A is a perspective view showing tensile force and compressive force which are generated in the side sill 100, and FIG. 9B is a cross-sectional view showing the same forces.

In FIG. 9A, a compressive force CC is generated in the upper wall 100a and the right wall 100d, and a tensile force TT is generated in the left wall 100c and the bottom wall 100b.

The compressive force CC and the tensile force TT are each a resultant force of the compressive force CM and the tensile force TE shown in FIG. 8A, and the compressive force CC increases as it approaches a corner portion 100e where the upper wall 100a intersects with the right wall 100d, whereas the tensile force TT increases as it approaches a corner portion where the left wall 100c intersects with the lower wall 100b.

Namely, in FIG. 9B, the compressive force (which is represented by "Comp" and "+") is generated in the cross section of the side sill 100 on one side of a K—K line as a boundary, whereas the tensile force (which is represented by "Tens" and "−") is generated on the other side thereof.

As a result, in the side sill 100 where the aforesaid two kinds of moments, that is, the torsional moment PL (refer to FIG. 7A) and the bending moment PM (refer to FIG. 7B) are generated, a bending moment around the K—K line or a bending moment FF which attempts to bend the side sill 100 in a direction in which an N—N line which intersects with the K—K line at right angles extends is generated by a combination of the torsional moment PL and the bending moment PM.

Thus, the compressive force is applied on an AA side of the cross section (the one side of the K—K line as a boundary) of the side sill 100, and the tensile force is applied on a BB side of the cross section (the other side of the K—K line) of the side sill 100. Consequently, in order to increase the stiffness of the side sill 100, the stiffness in the N—N line needs to be enhanced.

FIGS. 10A, 10B are fourth explanatory views explaining the deformation of the conventional side sill by the applied load, in which FIG. 10A is a cross section of the actual side sill 100 and FIG. 10B is a cross section showing a condition where the bending moment FF explained in FIGS. 9A, 9B is applied to the side sill 100.

On the actual side sill 100 shown in FIG. 10A, a stepped portion 116 is provided at an upper portion 115 of the outer member 108 for preventing the penetration of rain water into the passenger compartment, and as shown in FIG. 10B, the upper portion 115 of the outer member 108 is forced to deform largely in the vicinity of the stepped portion 116 from an initial condition indicated by phantom lines to a condition indicated by solid lines when the bending moment FF acts on the upper portion of the outer member 108 as the compressive force.

Consequently, in the event that the side sill 100 is reinforced in the direction in which the N—N line extends, the bending stiffness of the side sill 100 can be enhanced.

FIG. 11 is a graph showing the stiffness of the conventional side sill, and the axis of ordinate represents the horizontal load P that is applied to the center pillar as shown in FIG. 5B, whereas the axis of abscissa represents the displacement δ of the side sill in the horizontal direction by the load P.

In the figure, reference numeral 120 denotes a side sill including the outer member 108, the inner member 111 and a reinforcement member 121 which is interposed between the outer member 108 and the inner member 111. The side sill 120 draws almost a similar load-displacement curve to that of the side sill 100 shown in FIGS. 5A, 5B. Namely, in the event that a load is inputted sideways to the center pillar, the provision of the reinforcement member 121 shaped as shown in the figure can provide little advantage.

This is because the reinforcement member 121 does not provide a construction which can restrain the deformation of the outer member 108 of the side sill 120 since the reinforcement member is provided longitudinally whereas the bending moment FF resulting in the side sill 100 is generated in a diagonal direction, whereby a load of large magnitude is applied, in particular, to the upper portion 115 of the outer member 108 to thereby deform the outer member 108 of the side sill 100.

In addition, known as a side sill reinforcement structure is an "automotive side sill structure" disclosed in JP-A-2000-238666.

As shown in FIG. 12, the same Japanese Unexamined Patent Publication is a side sill structure in Which a side sill 203 includes a side sill outer 204 provided on an outer side of a vehicle body, a side sill inner 206 provided on an inner side of the side sill outer 204, a side sill strength 213 provided between the side sill outer 204 and the side sill inner 6 and adapted to connect the side sill outer 204 and the side sill inner at upper and lower portions thereof and a reinforcement plate 230 attached so as to close the back of a protruding portion 218 provided on the side sill strength 213.

The side sill 203 is constructed such that the side sill outer 204 and the side sill inner 206 are reinforced by the side sill strength 213 and the reinforcement plate 230, and this construction increases the number of components and complicates the construction of the side sill 203.

Furthermore, the side sill strength 213 is adapted merely to connect the upper and lower portions of the side sill and is not expected, as with the reinforcement member 121 shown in FIG. 11, to contribute to the restraining of the deformation of the upper portion of the side sill outer 204.

SUMMARY OF THE INVENTION

Then, an object of the invention is to increase the bending stiffness and torsional stiffness of a side sill efficiently with a simple construction by improving automotive side sill reinforcement structures.

With a view to attaining the object, according to a first aspect of the invention, there is provided an automotive side sill reinforcement structure for an automotive side sill which is constructed to have a closed cross-sectional construction by joining an outer member and an inner member which each have a substantially U-shaped cross section to sides of a reinforcement member disposed in a longitudinal direction, respectively, the automotive side sill reinforcement structure being characterized in that the reinforcement member is constructed to include a V-shaped sectional portion formed by bending the reinforcement member so as to follow a lower surface of an upper portion of the outer member, joining a resulting bent portion to the upper portion of the outer member, and bending the bent portion downwardly at a distal end thereof.

The upper portion of the outer member can be reinforced by joining the bent portion of the reinforcement member to the upper portion of the outer member, and the upper portion of the outer member and the lower portion of the lower portion of the side sill can be joined together rigidly by connecting the upper portion of the outer member with the lower portion of the side sill via the V-shaped sectional portion of the reinforcement member, whereby the bending stiffness and torsional stiffness of the side sill can be increased efficiently with a simple construction.

BRIEF DESCRIPTION OF THE DRAWINGS

FIGS. 4A to 4C are sectional views showing side sill reinforcement structures according to other embodiments of the invention;

DETAILED DESCRIPTION OF THE PREFERRED EMBODIMENTS

Figure 1:
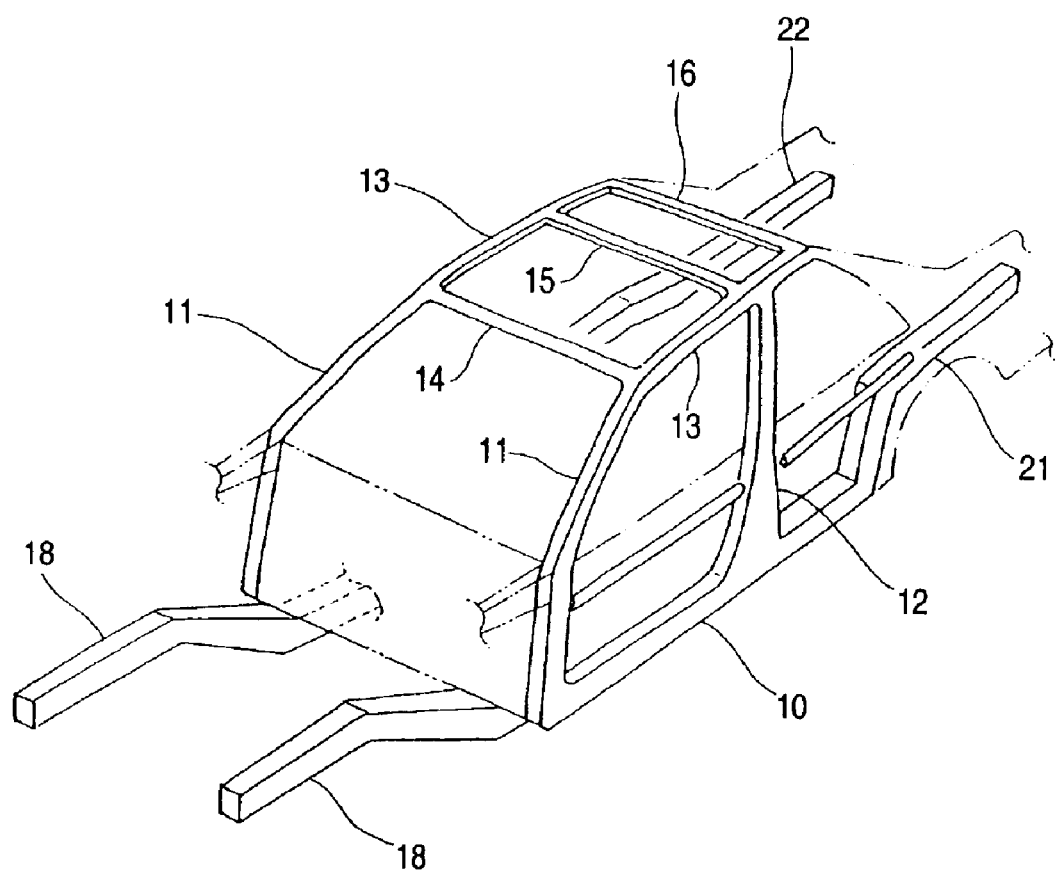
FIG. 1 is a perspective view showing a framework construction of a vehicle to which a side sill reinforcement structure according to the invention is applied.

Embodiments of the invention will be described below by reference to the accompanying drawings. Note that the drawings are viewed in a direction in which reference numerals are oriented.

FIG. 1 is a perspective view showing the framework of a vehicle which adopts a side sill reinforcement structure according to the invention, in which framework front pillars 11, 11 are made to extend upwardly from front ends of side sills 10, 10 (a side sill 10 on the opposite side is not shown), respectively, which are located on both sides of a passenger compartment at the bottom thereof, center pillars 12, 12 (a center pillar 12 on the opposite side is not shown) are made to extend upwardly from middle portions of the side sills 10, 10, roof side rails 13, 13 are attached to the front pillars 11, 11 and the center pillars 12, 12, and the side roof rails 13, 13 are connected together by roof rails 14, 15, 16. Note that reference numerals 18, 18 denote side frames made to extend from a lower part of the passenger compartment into an engine compartment, and reference numerals 21, 22 denote rear frames made to extend from the side sills 10, 10 to the rear.

Figure 2B:
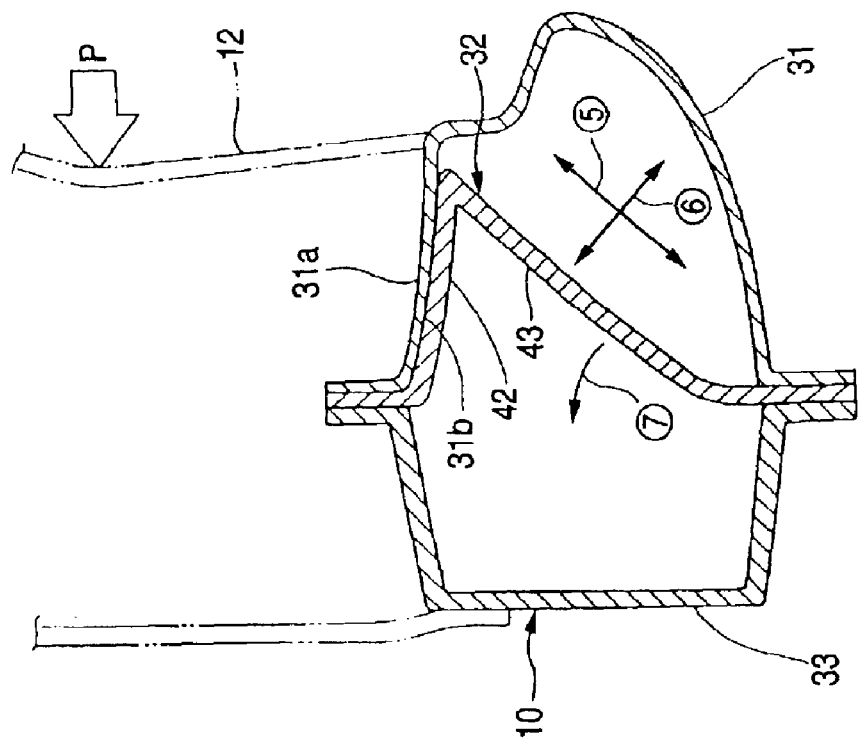
FIGS. 2A and 2B are sectional views showing a side sill reinforcement structure (according to a first embodiment) of the invention.
Figure 2A:
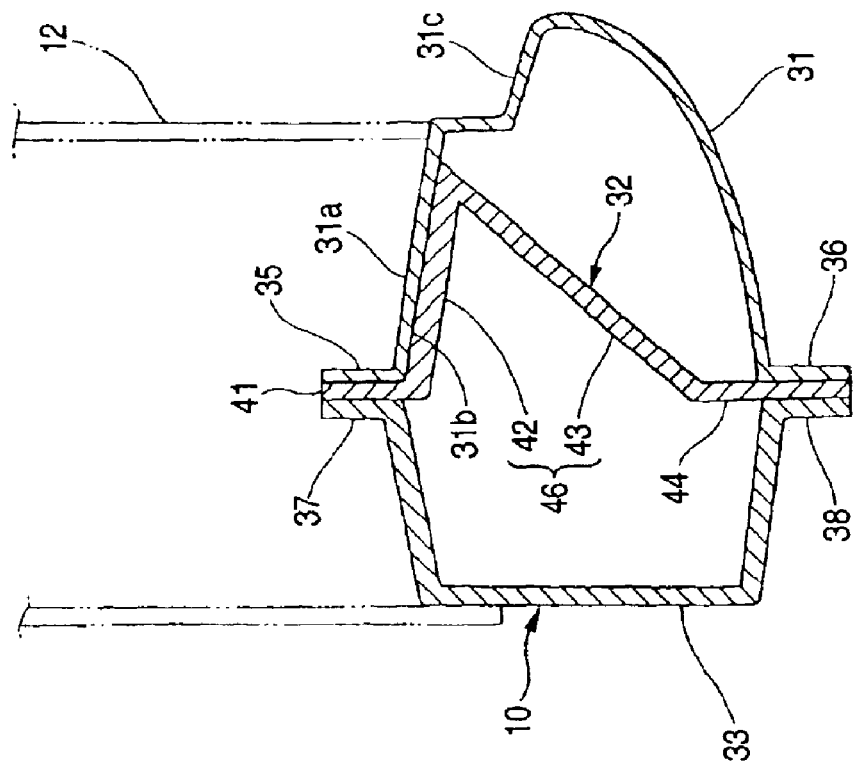

FIGS. 2A, 2B are cross-sectional views of a side sill reinforcement structure (according to a first embodiment) of the invention.

In FIG. 2A, the side sill 10 includes an outer panel 31 functioning as an outer member having a substantially U-shaped cross section and an inner panel 33 having a substantially U-shaped cross section which is joined to a passenger compartment side of the outer panel 31 via a reinforcement member 32.

The outer panel 31 is a member having outer flanges 35, 36 formed at upper and lower end portions thereof, and the inner panel 33 is a member having inner flanges 37, 38 formed at upper and lower end portions thereof, whereby an upper portion of the reinforcement member 32 is held between the outer flange 35 and the inner flange 37 to thereby be joined to the flanges and a lower portion of the reinforcement member 32 is held between the outer flange 36 and the inner flange 38 to thereby be joined to the flanges.

The reinforcement member 32 includes an upper flange portion 41 which is formed by bending part thereof upwardly so as to be interposed between the outer flange 35 and the inner flange 37, an upper attaching portion 42 functioning as a bent portion which is made to extend along a lower surface 31b of an upper portion 31a of the outer panel 31 and is then attached to the lower surface 31b, an inclined portion 43 which is bent in a V-shaped fashion from a distal end of the upper attaching portion 42 to extend in an inclined fashion inwardly and downwardly of the vehicle body, and a lower extended portion 44 which is made to extend downwardly from a lower end of the inclined portion 43 so as to be held between the outer flange 36 and the inner flange 38. Note that reference numeral 31c denotes a stepped portion provided downwardly of the upper portion 31a of the outer panel 31.

The upper attaching portion 42 and the inclined portion 43 are portions constituting a V-shaped cross-sectional portion 46 of the present invention.

Figure 7B:
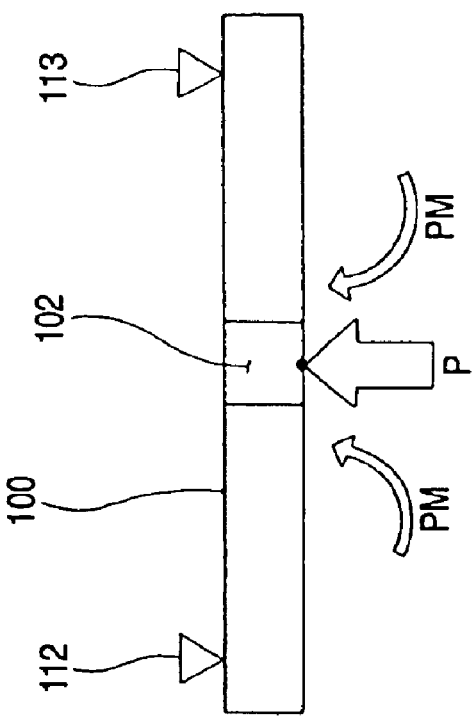
FIGS. 7A and 7B are first explanatory views explaining the deformation of the conventional side sill.
Figure 7A:
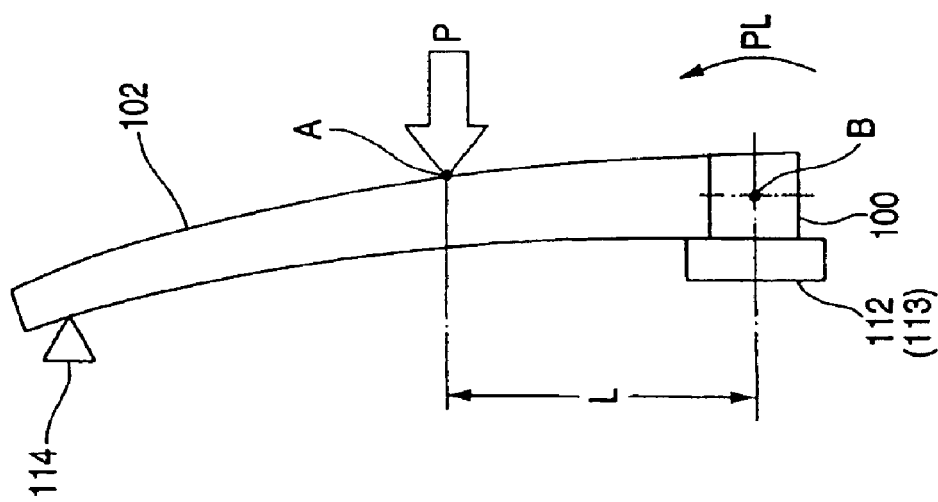
Figures 8A, 8B:
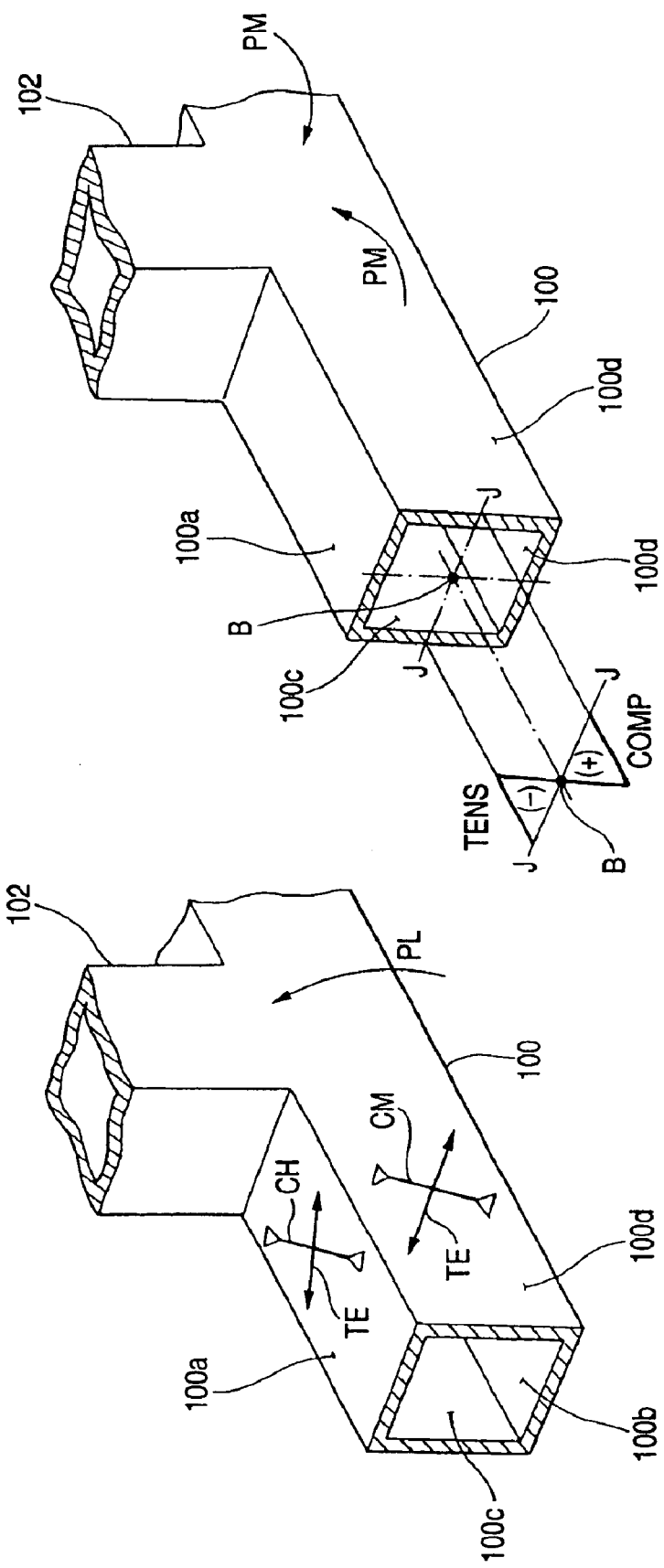
FIGS. 8A and 8B are second explanatory views showing the deformation of the conventional side sill.
Figure 9A:
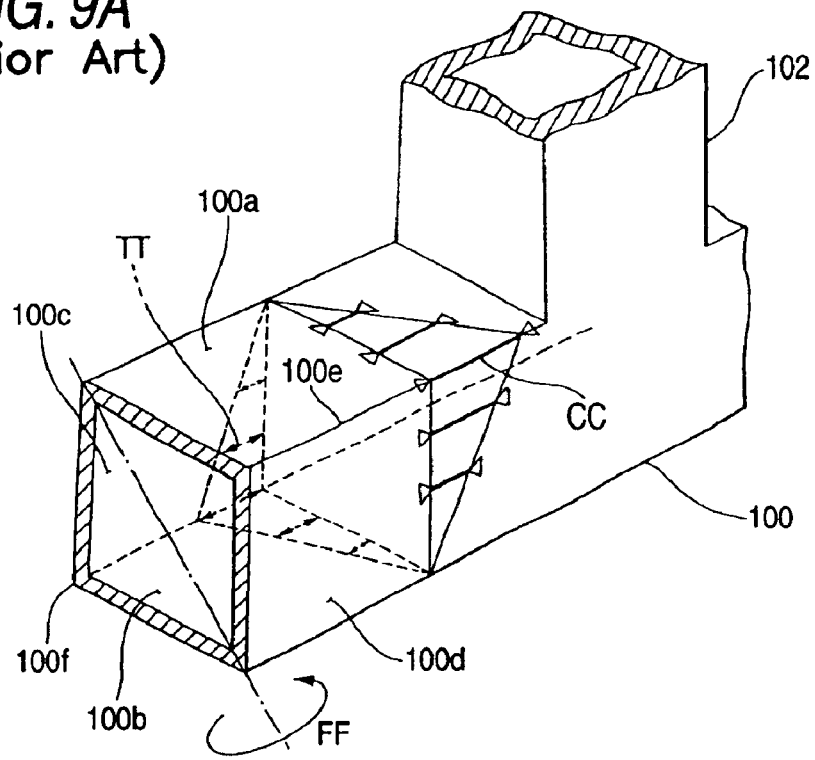
FIGS. 9A and 9B are third explanatory views showing the deformation of the conventional side sill.
Figure 9B:
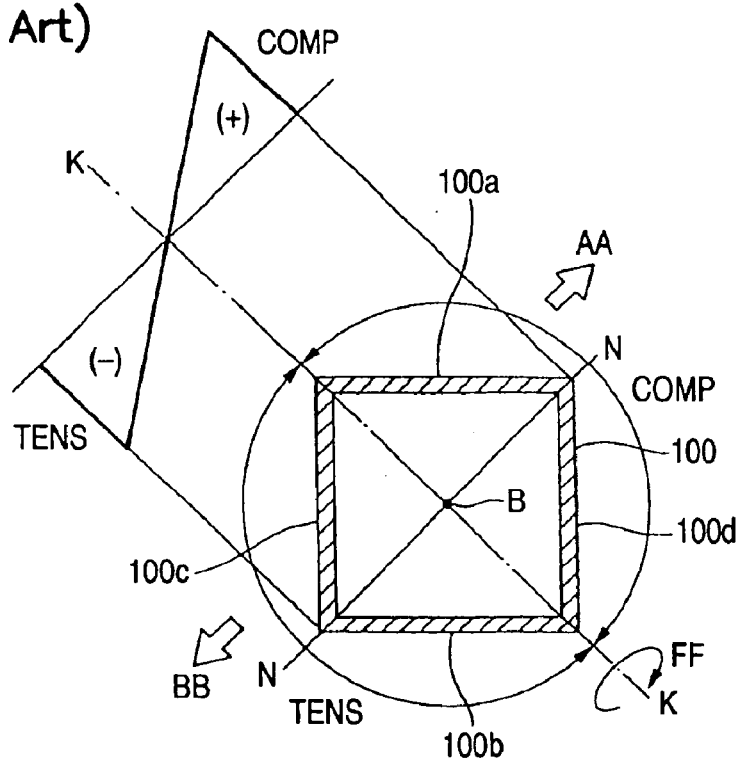
Figure 10B:
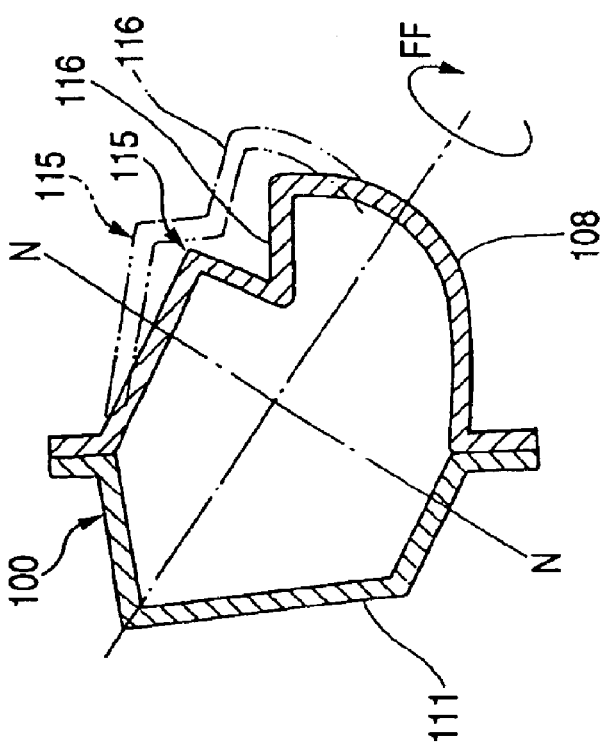
FIGS. 10A and 10B are fourth explanatory views showing the deformation of the conventional side sill.
Figure 10A:
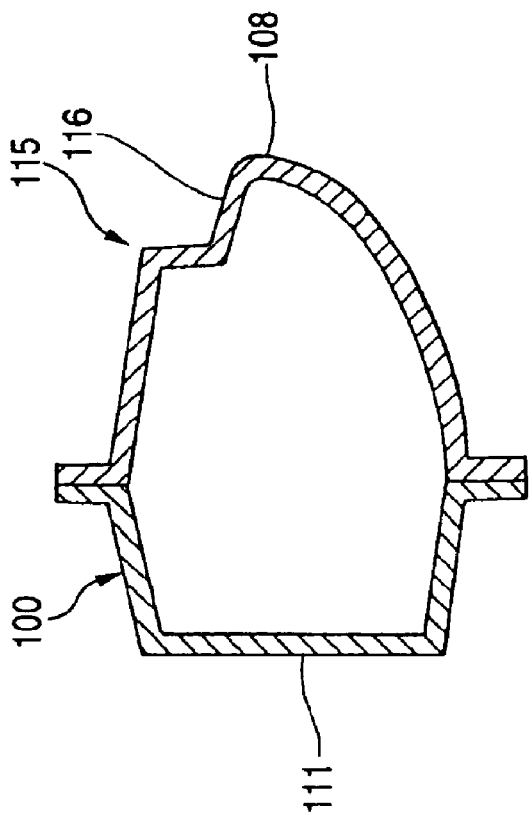

By attaching the upper attaching portion 42 of the reinforcement member 32 to the lower surface 31b of the upper portion 31a of the outer panel 31, the stiffness of the upper portion 31a of the outer panel 31, as well as the overall stiffness of the outer panel 31 in a direction indicated by an arrow 5 in which the inclined portion 43 is made to extend, in a direction indicated by an arrow 6 which intersects with the inclined portion 43 at right angles and in a direction 7 in which the reinforcement member 32 swings around a lower side of the side sill 10 are increased. Thus, in FIG. 2B, when a load P is applied to the center pillar 12 from the side of the vehicle in a direction indicated by an arrow, while a torsional moment PL (refer to FIG. 7A) and a bending moment PM (refer to FIG. 7B) are generated in the side sill 10, the deformation of the upper portion 31a of the outer panel 31 and the deformation of the outer panel 31 on the whole can be restrained, and hence the overall stiffness of the side sill can be enhanced.

Figure 3:
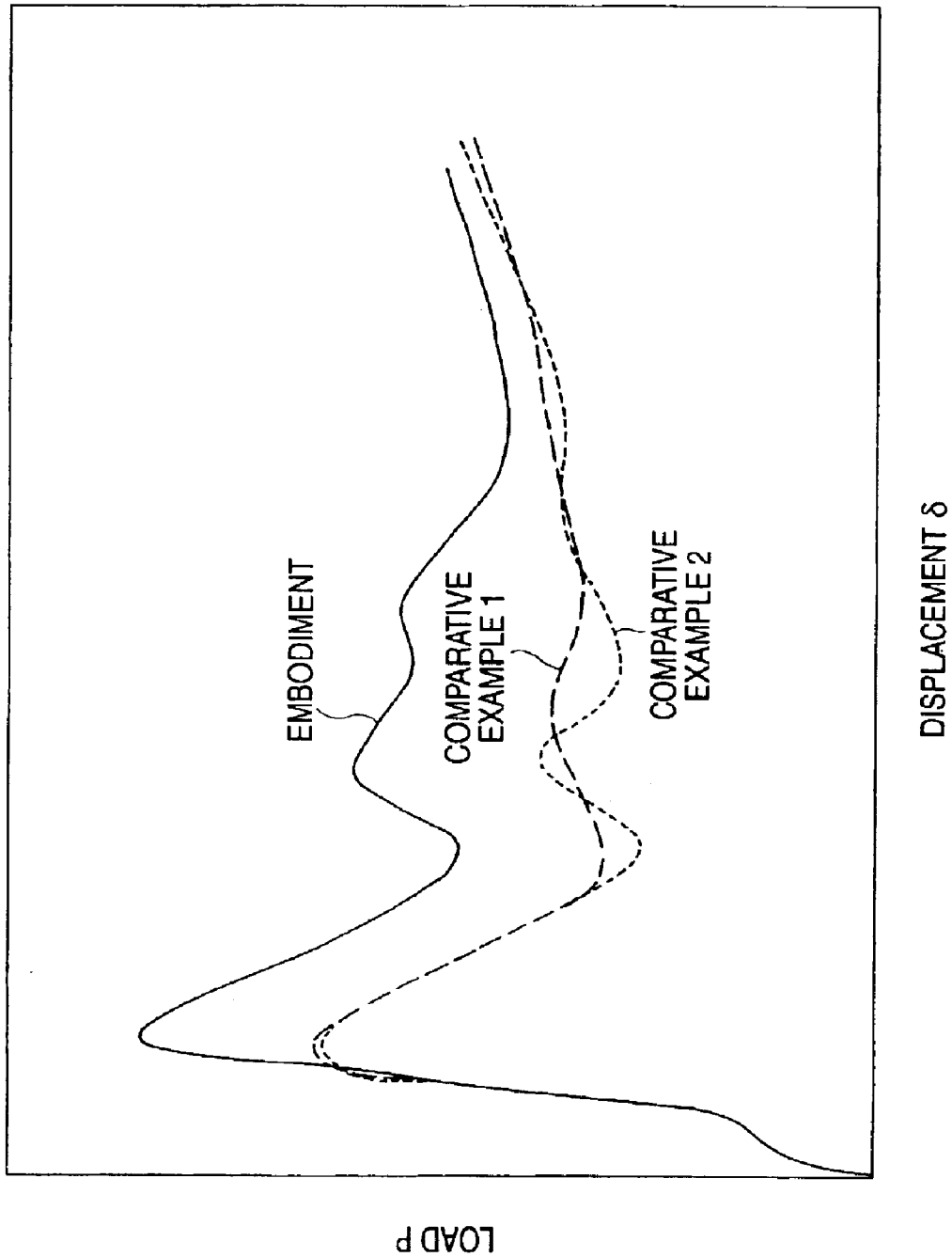
FIG. 3 is a graph showing the relationship between a load acting on a side sill (according to the first embodiment) of the invention and the displacement thereof.
Figure 5B:
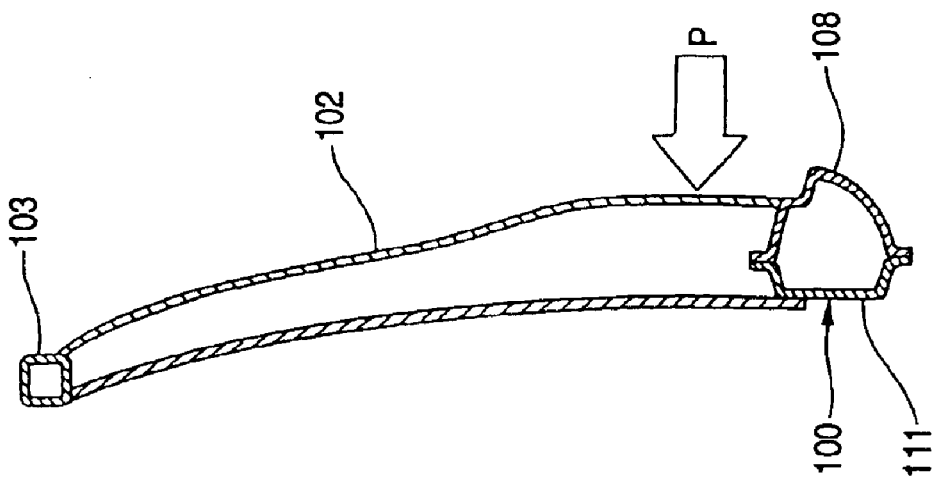
FIGS. 5A and 5B are explanatory views explaining a conventional side sill.
Figure 5A:
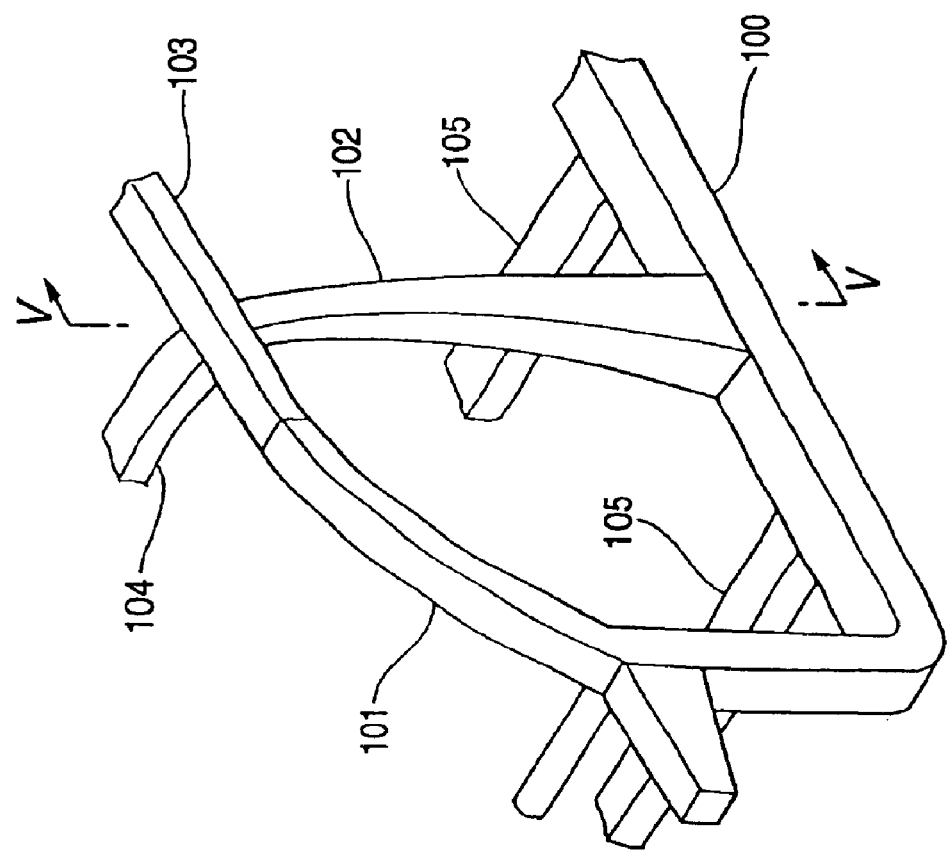
Figure 6:
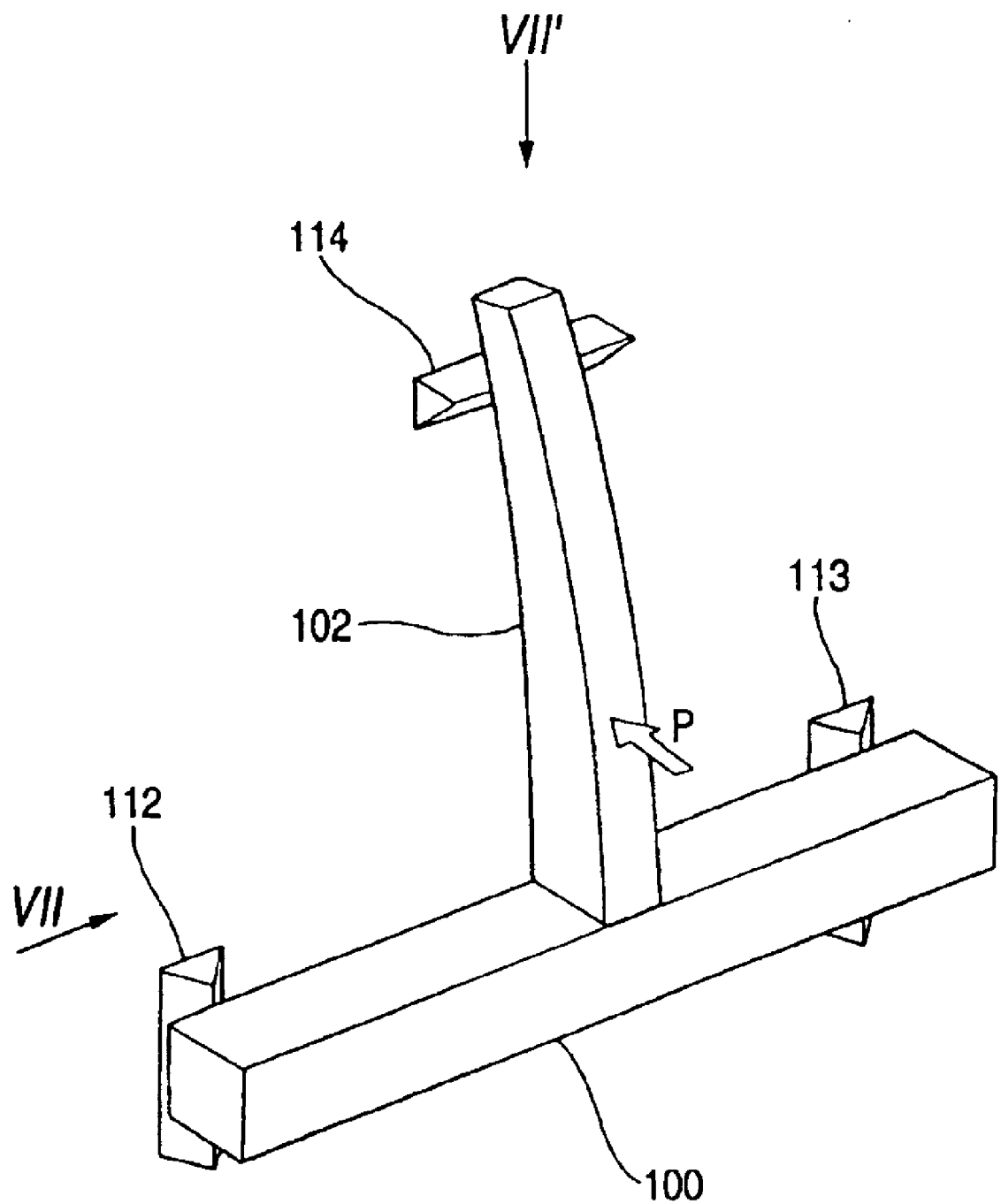
FIG. 6 is a perspective view explaining the deformation of the conventional side sill.

FIG. 3 is a graph showing the relationship between a load P acting on the side sill (according to the first embodiment) of the invention and the displacement thereof, in which the axis of ordinate represents a horizontal load P acting on the center pillar inwardly of the vehicle and the axis of abscissa represents the horizontal displacement $\delta$ of the side sill by the load P so applied.

Figure 11:
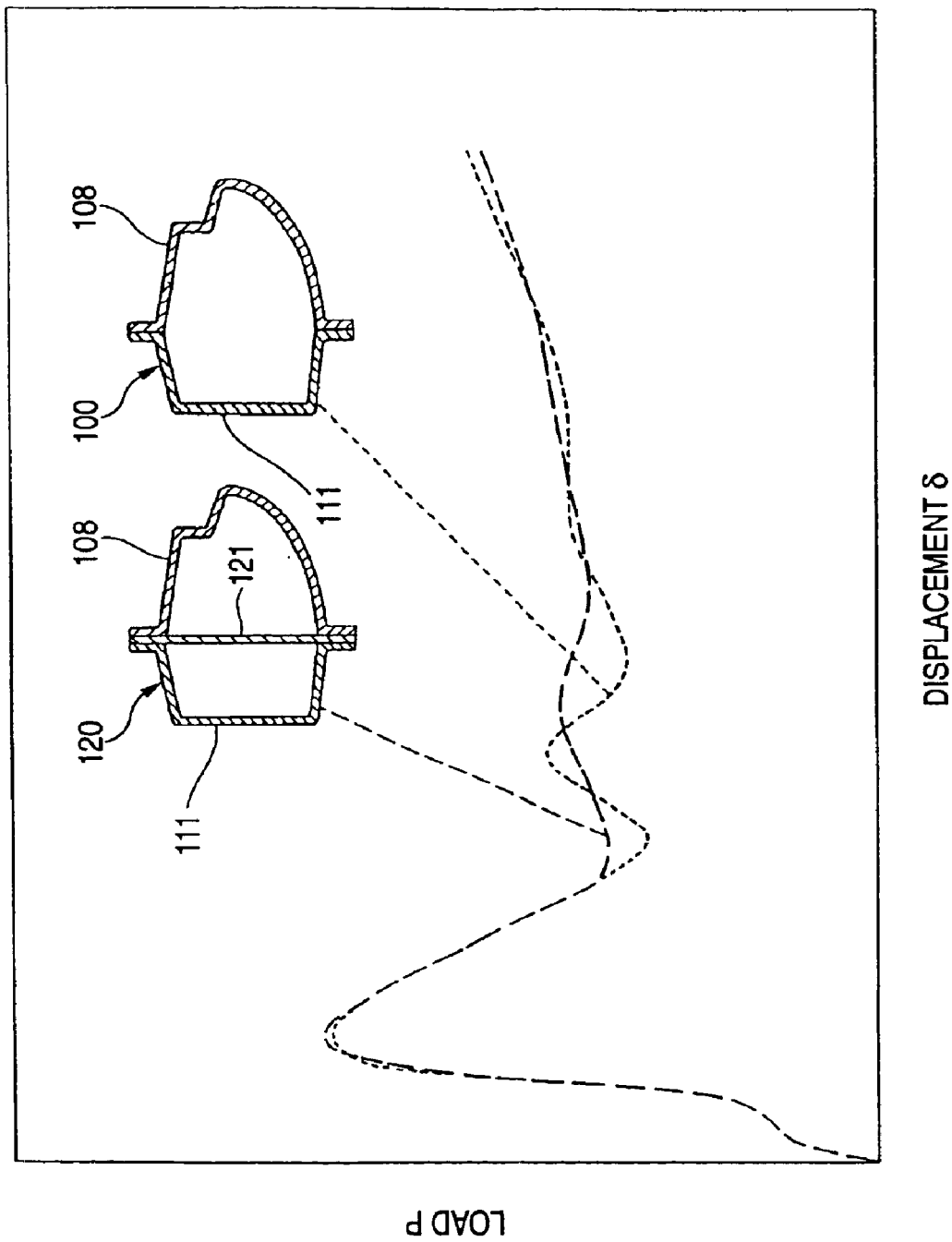
FIG. 11 is a graph showing the stiffness of the conventional side sill.
Figure 12:
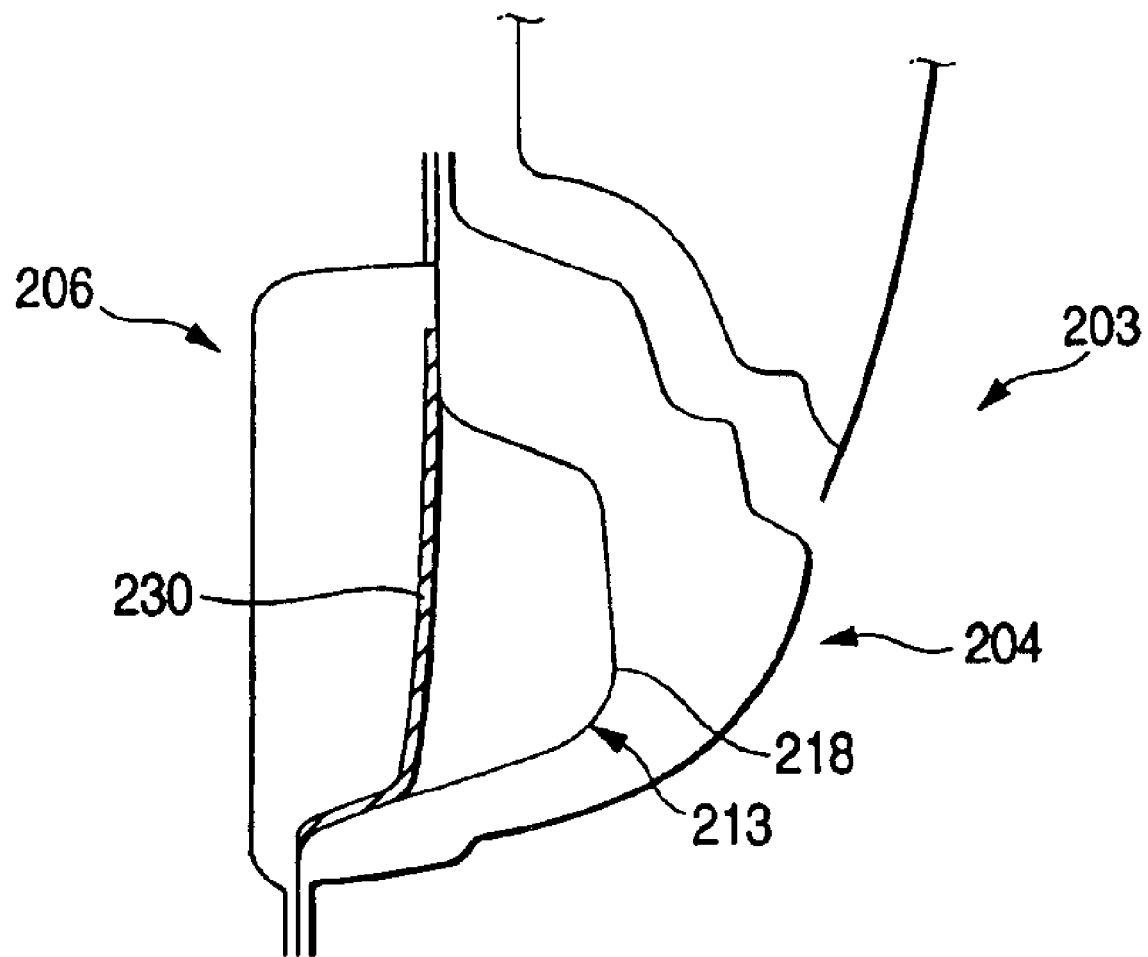
FIG. 12 is a sectional view of another conventional side sill reinforcement structure.

In the graph, a comparative example 1 (the side sill 120 shown in FIG. 11 which has the added reinforcement member 121) and a comparative example 2 (the side sill 100 in which the reinforcement shown in FIG. 11 is not provided) are shown in addition to the embodiment of the invention.

With the embodiment, the load P is largely increased relative to the comparative examples 1 and 2. This represents a remarkable advantage provided by the reinforcement member 32 (refer to FIG. 2).

As has been described while referring to FIGS. 2A, 2B, the invention provides the automotive side sill reinforcement structure for an automotive side sill which is constructed to have a closed cross-sectional construction by joining the outer panel 31 and the inner panel 33 which each have a substantially U-shaped cross section to the sides of the reinforcement member 32 disposed in the longitudinal direction, respectively, and the automotive side sill reinforcement structure has a feature that the reinforcement member 32 is constructed to include a V-shaped sectional portion 46 formed by bending the reinforcement member 32 so as to follow the lower surface 31b of the upper portion 31a of the outer panel 31, joining the upper attaching portion 42 functioning as a resulting bent portion to the upper portion 31a of the outer panel 31, and bending the upper attaching portion 42 downwardly at the distal end thereof.

The upper portion 31a of the outer panel 31 can be reinforced by joining the upper attaching portion 42 of the reinforcement member 32 to the upper portion 31a of the outer panel 31. The upper portion 31a of the outer panel 31 and the lower portion of the side sill 10 can be joined together rigidly by connecting the upper portion 31a of the outer panel 31 with the lower portion of the side sill 10 via the V-shaped cross-sectional portion 46. Accordingly, the bending stiffness and the torsional stiffness of the side sill 10 can be increased efficiently with the simple construction.

In addition, since the side sill 10 is constructed simply, the production cost of the side sill 10 can be reduced, and furthermore, the weight of the side sill 10 can also be reduced.

FIGS. 4A to 4C are cross-sectional views showing side sill reinforcement structures according to other embodiments of the invention. Note that like reference numerals are given to like constituent components to those of the first embodiment shown in FIGS. 2A, 2B and the description thereof will be omitted herein.

A side sill 50 (according to a second embodiment) shown in FIG. 4A is a member in which an inner panel 33 is attached to an outer panel 31 via a reinforcement member 51.

The reinforcement member 51 includes an upper flange portion 41, an upper attaching portion 52 functioning as a bent portion which is made to extend along a lower surface 31b of an upper portion 31a of the outer panel 31 to an intermediate position along the length of the upper portion 31a to thereby be attached to the lower surface 31b, a short extended portion 53 which is made to extend downwardly from a distal end of the upper attaching portion 52, an inclined portion 54 which is made to extend from a lower end of the short extended portion 53 inwardly and downwardly of the vehicle body in an inclined fashion and a lower extended portion 55 which is made to extend downwardly from a lower end of the inclined portion 54 so as to be held between an outer flange 36a and an inner flange 38.

The upper attaching portion 52, the short extended portion 53 and the inclined portion 54 constitute a portion which is bend substantially into a V-shape and hence forms a V-shaped cross-sectional portion 57.

A distance from the upper flange portion 41 to the lower extended portion 55 of the reinforcement member 51 can be reduced by allowing the upper attaching portion 52 of the reinforcement member 51 to extend as far as the intermediate position along the length of the outer panel 31, whereby the weight of the reinforcement member 51 can be reduced, and the stiffness of the side sill 50 can be enhanced while reducing the production cost thereof.

A side sill 60 (according to a third embodiment) shown in FIG. 4B is a member in which an inner panel 33 is attached to an outer panel 31 via a reinforcement member 32 to which a reinforcement plate 61 is attached.

The reinforcement plate 61 is a member which is attached to one end portion of an upper attaching portion 42 of the reinforcement member 32 at an upper end thereof and is attached to an upper side of a lower extended portion 44 at a lower end thereof.

Thus, the deformation of the reinforcement member 32 can be restrained by the reinforcement plate 61 by attaching the reinforcement plate 61 to the reinforcement member 32, and the stiffness of the outer panel 31 and hence the side sill 60 can be enhanced further.

A side sill 70 (according to a fourth embodiment) shown in FIG. 4C is a member in which an inner panel 33 is attached to an outer panel 31 via a reinforcement member 71.

The reinforcement member 71 includes a first reinforcement material 72 and a second reinforcement material 73 connected to the first reinforcement material 72.

The first reinforcement material 72 includes an upper flange portion 41, an upper attaching portion 52 which is made to extend to follow a lower surface 31b of an upper portion 31a of the outer panel 31 to an intermediate position along the length of the upper portion 31a to thereby be attached to the lower surface 31b, and a short extended portion 53 which is made to extend downwardly from a distal end of the upper attaching portion 52.

The second reinforcement material 73 includes an upper connecting portion 76 which is joined to the short extended portion 53 of the first reinforcement material 72, an inclined portion 77 which is made to extend from a lower end of the upper connecting portion 76 inwardly and downwardly of the vehicle body in an inclined fashion, and a lower extended portion 55 which is made to extend downwardly from a lower end of the inclined portion 77 so as to be held between an outer flange 36 and an inner flange 38.

The upper attaching portion 52 of the first reinforcement material 72, the short extended portion 53 and the upper connecting portion 76 of the second reinforcement material 73 constitute a portion which is substantially bent into a V-shape and hence forms a V-shaped cross-sectional portion 78.

By dividing the reinforcement member 71 into the first reinforcement material 72 and the second reinforcement material 73, for example, only the first reinforcement material 72 can be attached without attaching the second reinforcement material 73. Namely, depending upon vehicles, a sufficient stiffness can be obtained only by reinforcing the upper portion 31a of the outer panel 31 by the side sill having the outer panel 31, the inner panel 33 and the first reinforcement material 72.

Note that the side reinforcement structures according to the invention may be applied over the full longitudinal length of the side sill or may be applied to part of the side sill in the longitudinal direction, in particular, only to part thereof in the vicinity of the center pillar.

While only certain embodiments of the invention have been specifically described herein, it will apparent that numerous modifications may be made thereto without departing from the spirit and scope of the invention.

The invention provides the following advantage through the structures described above.

The side sill reinforcement structure according to the first aspect of the invention is constructed so as to include the V-shaped cross-sectional portion formed by bending the reinforcement member so as to follow the lower surface of the upper portion of the outer member to thereby allow the resulting bent portion to be joined to the upper portion of the outer member and bending the distal end of the bent portion downwardly, whereby not only can the upper portion of the outer member be reinforced by joining the bent portion of the reinforcement member to the upper portion of the outer member, but also the upper portion of the outer member and the lower portion of the side sill can be joined together rigidly by connecting the upper portion of the outer member to the lower portion of the side sill via the V-shaped cross-sectional portion of the reinforcement member, thereby making it possible to increase the bending stiffness and the torsional stiffness of the side sill efficiently with the simple construction.

What is claimed is:

1. An automotive side sill, comprising: an outer member and an inner member, each having a substantially U-shaped cross section; and a reinforcement member disposed in a longitudinal direction, and respectively jointed to said outer member and inner member at respective inner and outer side surfaces of said reinforcement member at upper and lower ends of said reinforcement member, said reinforcement member creating a closed cross-sectional construction between said reinforcement member and said inner member said reinforcement member including a substantially V-shaped sectional portion comprising:

a first leg that follows a lower surface of an upper portion of said outer member; and a second leg connected to said first leg, the second leg defining an acute angle with said first leg.

* * * * *